April 3, 1962 E. F. HAMILTON, JR., ET AL 3,027,602
PROCESS FOR PREPARING GLOSSY, TRANSPARENT NYLON FILMS
BY MELT EXTRUSION OF SUPERPOLYAMIDE RESINS
Filed Dec. 16, 1957 3 Sheets-Sheet 3
*Fig. Va*
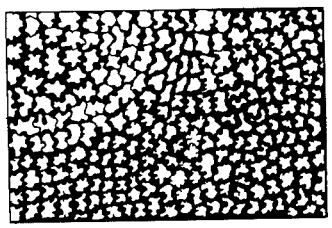
*Fig. VIa*
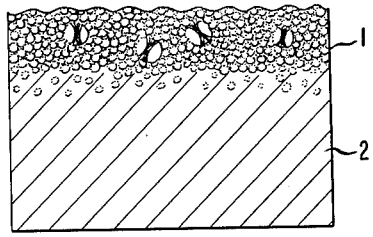
*Fig. Vb*
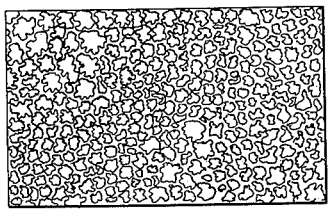
*Fig. VIb*
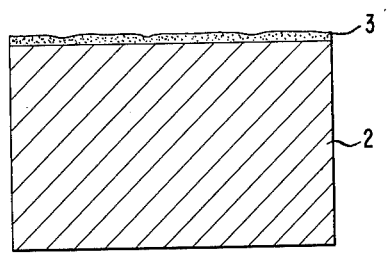
*Fig. Vc*
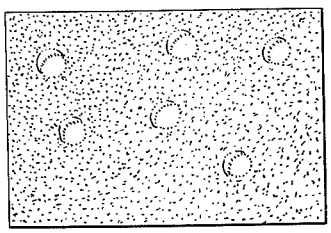
*Fig. VIc*
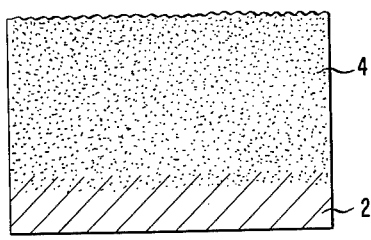
*Fig. VId*
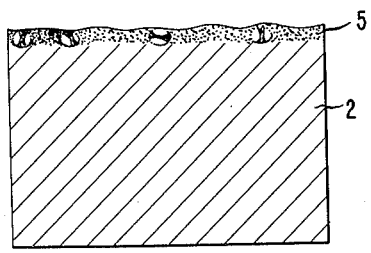
INVENTORS
EDWARD FRITJOFF HAMILTON, JR.
JAMES PAUL HARRINGTON
BY
ATTORNEY United States Patent Office 3,027,602
Patented Apr. 3, 1962

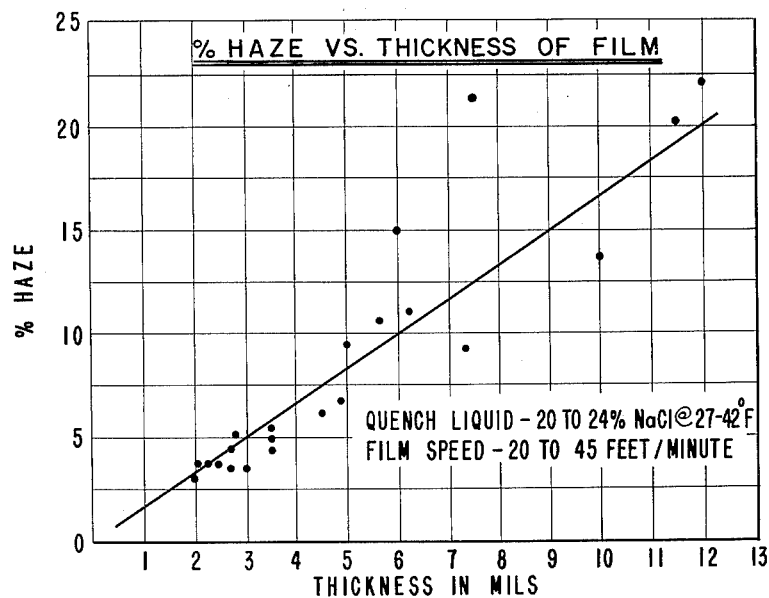
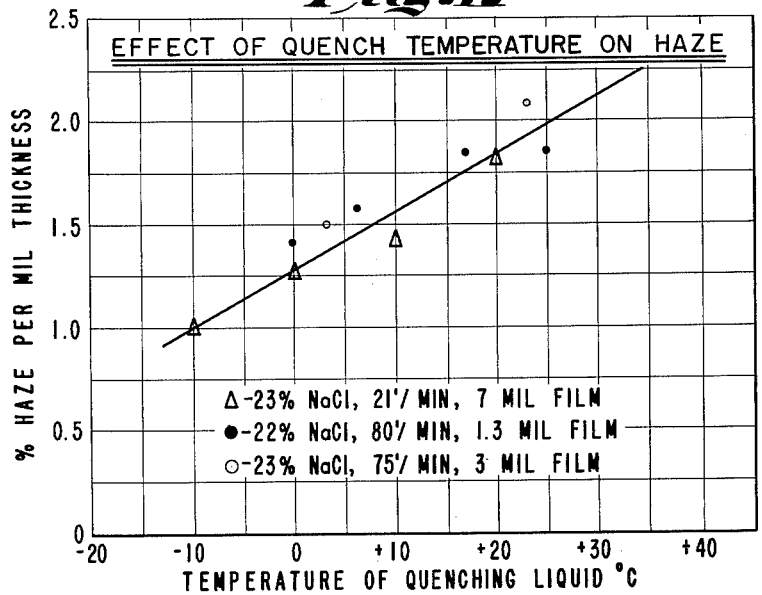

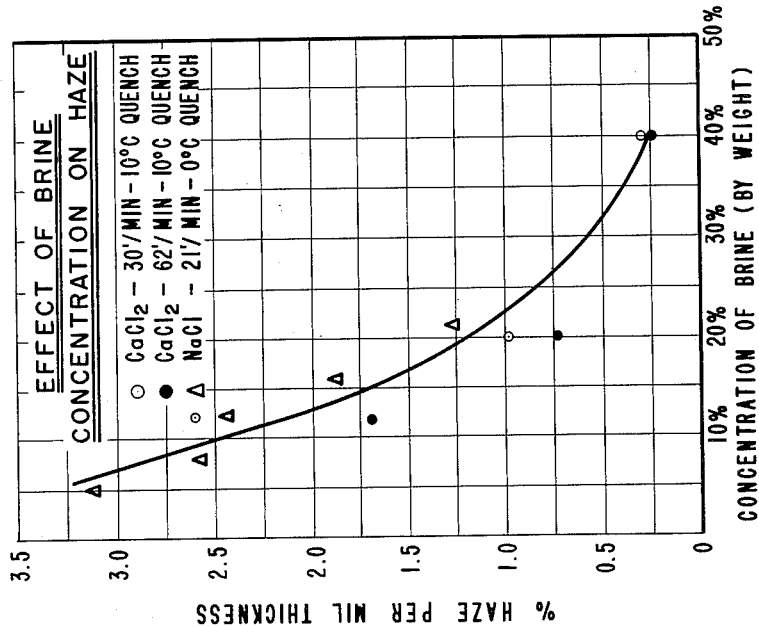
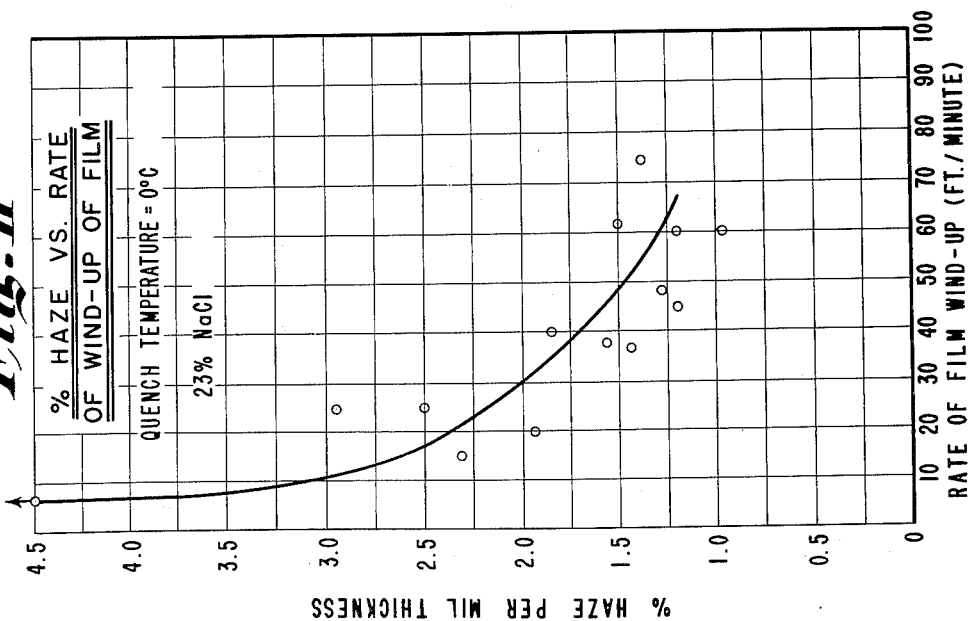

3,027,602
PROCESS FOR PREPARING GLOSSY, TRANSPARENT NYLON FILMS BY MELT EXTRUSION OF SUPERPOLYAMIDE RESINS
Edward Fritjoff Hamilton, Jr., Thornton, Pa., and James Paul Harrington, Greenville, Del., assignors to E. I. du Pont de Nemours and Company, Wilmington, Del., a corporation of Delaware
Filed Dec. 16, 1957, Ser. No. 702,912
2 Claims. (Cl. 18—57)

This invention is concerned with a process for preparing glossy, transparent films from superpolycarbonamide polymers, hereinafter referred to as nylons. More particularly it is concerned with a process for melt-extrusion of nylons under conditions whereby films of exceptional gloss, transparency, and freedom from haze are obtained.

The nylons with which this invention is concerned are well-known to the art. They are prepared by intermolecular condensation polymerization of dicarboxylic acids with diamines, or by the intramolecular polymerization of aminoacids to give superpolymers. Amide-forming derivatives may be used instead of the free acids and amines. Particularly desirable nylons are those prepared by the condensation of hexamethylene diamine with adipic acid or with sebacic acid and by the intramolecular polymerization of caprolactam as well as various copolymers of these materials. When such condensation polymers are prepared so as to be of high molecular weight, that is, when the polymerizations are carried far enough so that the products have an intrinsic viscosity greater than 0.4 dl./g. and preferably greater than 0.6 dl./g., they can be formed into films which are very tough and flexible as disclosed in United States Patent Number 2,130,948 issued on September 20, 1938, to Carothers. However, such films are normally opaque or translucent, depending upon their thickness.

Various methods for achieving improved transparency in melt-extruded nylon films have also been revealed in the prior art. Thus, in United States Patent Number 2,212,772 issued on August 27, 1940, to Graves, there is disclosed a process for rapid quenching of the molten resin whereby films having improved transparency are obtained. It is disclosed therein that this rapid quenching in cold water, or other suitable liquid which does not react with or dissolve in the polyamide, produces a film having crystal aggregates, now usually referred to as spherulites, whose average diameter is less than 2 microns. The absence of large spherulites is thought to be responsible at least in part for the improved transparency of the nylon films. While the process disclosed by Graves does result in nylon films which are much more transparent than can be obtained without rapid quenching, these nylon films are not as transparent as desired for many commercial uses, and they have a surface haze which renders them unattractive by comparison with such commercial films as cellophane or films prepared from polyethylene terephthalate polymers.

The surface haze referred to above has long been recognized as a serious limitation on the attractiveness and usefulness of nylons for film purposes. Thus, in United States Patent Number 2,212,770 issued on August 27, 1940, to Foster it was disclosed that contact of molten nylon resins with most liquids, including water, produces a surface haze on the film. Foster describes a process for extrusion of a thin sheet of molten resin onto a cold, rotating roll in order to obtain rapid quenching without contact of the molten resin with deleterious liquids. In this patent it is taught that certain liquids (which do not produce a surface haze on the nylon film) may be placed on the cold roll to obtain better contact of the nylon film with the roll and hence more rapid quenching. Such liquids include mineral oils, kerosene, and xylene which all have the disadvantage of being inflammable. The above process has the further disadvantage that elaborate equipment is required, that it is generally only suitable for preparing relatively narrow film strips, and, more importantly, that the quenching obtained is non-uniform since substantially all of the cooling is accomplished from one side of the film with the result that only relatively thin films can be prepared in this way since the rate of quenching the product film is more rapid on one side than on the other; the resultant films are in any case non-uniform, having different optical and tensile properties on one side than on the other.

Therefore it is an object of this invention to provide a process for preparing uniform, glossy, transparent nylon films free from surface haze and having spherulites with an average diameter less than one micron, the maximum diameter of any of said spherulites being less than three microns. It is another object of this invention to provide a process for rapid, uniform quenching of molten nylon as it is extruded in the form of a thin film from a slit die, which process will produce a glossy surface on the nylon film. Still another object of this invention is to provide a non-flammable, water-soluble medium for use in a bath for quenching molten nylon films, which medium will not produce a surface haze on the solidified nylon film. Other objects and advantages of this invention will appear from the following description of this invention and from the examples of its application.

FIGURE 1 is a graph relating film thickness to percent haze; it is used to illustrate Example 4.

FIGURE 2 is a graph relating rate of film travel to percent haze per mil of film thickness; it is used to illustrate Example 5.

FIGURE 3 is a graph relating brine concentration to percent haze per mil of film thickness; it is used to illustrate Example 6.

FIGURE 4 is a graph relating brine temperature to percent haze per mil of film thickness; it is used to illustrate Example 7.

FIGURE 5 is a series of three drawings of photomicrographs at 700× magnification showing the surfaces of nylon films quenched in different media at 10° C.

FIGURE 6 is a series of four four drawings of photomicrographs at 700× magnification showing cross-sections, at the surface, of nylon films quenched in different media.

It has now been discovered that the objects of this invention can be achieved by a process for preparing glossy, transparent nylon films having a thickness between 0.3 and 15 mils which comprises the following steps: (1) extruding the nylon as a molten film at from 5° to 75° C. above the melting point of said nylon; (2) passing the molten film into an aqueous brine quench bath maintained at a temperature from $-20°$ to $+450°$ C., said aqueous brine consisting of a solution in water of at least 5% by weight of a salt chosen from the group consisting of a cationic member chosen from the group consisting of alkali metal and alkaline earth metal cations and an anionic member chosen from the group consisting of chloride, bromide, nitrate, sulfate, and organic monocarboxylates containing from one to four carbon atoms per molecule, and mixtures thereof; (3) passing the quenched film from the quench bath into a series of wash baths consisting of from 1 to 3 baths, the first bath containing a liquid chosen from the group consisting of water and an aqueous solution of a salt chosen from the group consisting of alkali metal chlorides, alkali metal sulfates, alkali metal nitrates, alkali metal acetates, alkali metal citrates, aluminum chloride, and aluminum sulfate, and the remaining baths containing water; and (4) drying and winding up the washed film at a rate of at least 10 ft./minute up to about 150 ft./minute.

The nylon films obtained as the products of this process are outstanding, by comparison with nylon films obtained by processes of the prior art, with respect to gloss, clarity (freedom from haze) and transparency. This surprising result is due to several factors. The rapid quenching achieved by the use of the cold brines results in exceptionally smooth surfaces on the film as well as in the crystallization of the nylon polymer in such a way that the aggregation of crystallites into spherulites is modified to yield nylon in film form in which the spherulites, as determined by light-scattering methods, have an average diameter of less than 1 micron and in which even the larger spherulites have a diameter of less than 3 microns. As a result there is essentially no internal deflection of transmitted light. Furthermore, it has been found that, even in the absence of optically resolvable spherulites, there is a fine, grainy structure in the surface layer of nylon films which will detract from their optical clarity if the total thickness of the two grainy layers on both sides of the film is about 20 microns or more. When there are spherulites of 1–3 micron diameter in the grainy surface layers, then surface layers totalling 8 microns and more are deleterious to the transparency and haze of the films. The films obtained by the process of this invention have grainy surface layers totalling less than 20 microns in thickness in all cases, and, where spherulites having average diameter of less than 1 micron and maximum diameters of 3 microns are present, these novel films have surface layers totalling less than 8 microns in thickness. The surprisingly smooth film surfaces obtained by the practice of this invention reduce the distortion of reflected light as well as of transmitted light at the surfaces of the film with the result that surface haze is minimized and high gloss is obtained.

The degree of transparency and gloss obtained in a particular case by the process of this invention is determined by a number of factors including the nylon polymers employed, the brine-quenching solution chosen, and certain processing variables including the temperature of the quench bath, the concentration of the brine solution, the thickness of the film, the rates of extrusion and windup employed, and the procedure chosen for washing the quenched film to remove the salt solution employed in the quench bath. These factors are discussed individually in detail below and illustrated with a number of specific examples. The critical factor in this process is the discovery that replacement of water in the quench-bath by a brine solution results in an unexpected, remarkable improvement in both the gloss and transparency of the nylon films quenched in the bath.

For these experiments standard extrusion apparatus was employed. Nylon in the form of molding "flake" was fed through a hopper to the screw of an extruder whereby it was transported along a heated barrel, melted, compacted, and forced through a slit die attached to the end of the extruder. The slit die was positioned approximately from ½ to 1½ inches above the liquid level in a quench bath so that the molten sheet of nylon passed directly from the slit into the liquid brine quench bath and down under and around a roller immersed in the tank. The quenched film was then drawn out of the quench bath through a pair of variable speed pinch rolls which controlled the rate of take-off of the film, thence through one or more wash baths to a wind-up roll which was operated so as to wind up the film at the take-off rate. It is also possible to operate with the variable speed pinch rolls immersed in the quench bath directly under the slit die. The thickness of the film was governed by controlling the width of the die slit and the ratio of extrusion rate to film take-off rate as would be understood by anyone familiar with the art of film extrusion. The quenching liquid was cooled by various suitable means including circulating the liquid through a heat exchanger and immersing cooling coils in the quench bath. While the quench bath may be operated at any temperature in the range between $-20°$ C. and $+45°$ C., it is preferable to operate at a temperature between $-10°$ C. and $+30°$ C., the lower limit being governed by the high cost of cooling to lower temperatures as well as by the freezing point of the brine, and the upper limit being governed by the transparency and clarity of the nylon film desired since, in general, other conditions being constant, a lower brine temperature produces a more transparent film.

The film may be wound up at any rate between 5 and about 150 feet per minute although with the equipment employed for these experiments the preferred range was between 40 and 110 feet per minute. As described hereinbelow (see Example 5) a faster film travel rate will produce more transparent film when other conditions are relatively constant. While the process of this invention is applicable to films of from 0.3 mil to 15 mils thickness, the preferred range is from 0.5 to 10 mils. The thickness of the film obtained depends primarily on the slit width and on the ratio of throughput, in pounds per hour, to film travel rate. Films of less than 0.5 mil thickness are somewhat difficult to handle while the upper limit on film thickness is governed by the transparency and strength desired. Films thicker than about 10 mils show less transparency, as measured by percent haze per mil, than thin films since the rate of cooling of the center portion of such films is limited by the relatively slow rate of heat transfer through a polyamide, and slower cooling results in larger spherulites in the center of such films, which larger spherulites decrease the transparency of the film by scattering the transmitted light.

For the purpose of quantitative comparisons of the films produced in these experiments, transparency was measured as percent haze which is defined as that percentage of transmitted light which deviates from the direction of the incident beam by forward scattering. The standard method employed to determine percentage haze was ASTM #D–1003–52 which measures only the light flux deviating more than 2.5 degrees from the direction of the incident beam. The instrument used to measure haze was a recording spectrophotometer manufactured by the General Electric Company.

It is to be understood that the examples used to illustrate this invention are not intended to limit it in any way since it would be obvious to anyone familiar with the art of film extrusion that an almost infinite number of variations in the process conditions may be employed within the limitations disclosed herein for carrying out this invention.

EXAMPLE 1

A polyhexamethylene sebacamide nylon polymer having an inherent viscosity of 1.25 dl./g. measured in m-cresol at 0.5 g./100 ml. concentration, $25.00 \pm .05°$ C., was extruded as described hereinabove at 245° C. into a quench bath consisting of a solution of 25% by weight of sodium chloride in water maintained at 5° C. The 13.8 mil film after washing in water had a haze of only 1.2% measured as described above, or 0.086% per mil.

EXAMPLE 2

A nylon copolymer comprised of equal parts by weight of polyhexamethylene adipamide and polyhexamethylene sebacamide and having an inherent viscosity of 1.32 dl./g. measured in m-cresol at 0.5 g./100 ml. concentration, $25.00 \pm .05°$ C., was extruded as described hereinabove at a melt temperature of 239° C. and at a take-off rate of 6 feet per minute into a water quench bath maintained at 25° C. The 6-mil film obtained has a 10.2% haze or 1.7% haze per mil. When the same polyamide was extruded at a take-off rate of 7 feet per minute into a brine quench bath consisting of 23% by weight sodium chloride in water maintained at 25° C., the 7-mil film obtained after washing in water had a 6.6% haze or 0.94% haze per mil, approximately one-half the haze of the film extruded into water.

EXAMPLE 3

A polyhexamethylene adipamide nylon polymer having an inherent viscosity of 1.9 dl./g., measured in m-cresol at 0.5 g./100 ml. concentration, 25.00±.05° C., was extruded, as described hereinabove, at 301° C. through a slit die which was positioned ½ inch above the liquid level of a quench bath containing water maintained at 9° C. The take-off rate was 50 ft. per minute. The 3-mil film obtained had a haze of 12% or 4% haze per mil. When the same polyamide was extruded under the same conditions into a quench bath consisting of a 20.8% by weight solution of sodium chloride in water, the 3-mil obtained after washing in water had 6.0% haze or 2% haze per mil, half as much as the film extruded into water.

EXAMPLE 4

The effect of film thickness on the total percent haze observed was determined from a series of experiments similar to Example 3 employing polyhexamethylene adipamide nylon and a sodium chloride brine quench. The results are summarized in FIGURE 1 which shows that total percent haze is proportional to the total film thickness in the region up to 12 mils thickness. While there is some scattering of the experimental points, this may be a reflection of the fact that for this series of experiments the quench liquid was varied between 20 and 24% by weight sodium chloride, the temperature of the quench baths was varied between 27 and 42° F., and the film speed between 20 and 45 feet per minute.

EXAMPLE 5

The effect of the rate of film travel (take-off and wind-up) in feet per minute on the percent haze per mil of film thickness was determined in a series of experiments similar to Example 3 employing polyhexamethylene adipamide nylon. The quench bath used was a 23% by weight solution of sodium chloride in water, maintained at 0° C. The results are summarized in FIGURE 2 from which it may be seen that the percentage haze per mil of film thickness is an inverse function of the rate of film wind-up.

EXAMPLE 6

The effect of brine concentration on percent haze per mil of film thickness was determined in another series of experiments with polyhexamethylene adipamide. The nylon polymer was extruded through a slit die as described in Example 3 hereinabove. As quench baths, both sodium chloride brines at 0° C. and calcium chloride brines at 10° C. were employed. Since calcium chloride brine quench baths generally yield more transparent films than sodium chloride brines, a 10° C. higher temperature was used to make the results comparable to sodium chloride brines at 0° C. These experiments are summarized in FIGURE 3 from which it may be seen that percent haze per mil of film thickness is an inverse function of brine concentration.

EXAMPLE 7

The effect of brine temperature on percent haze per mil of film thickness was determined in another series of experiments with polyhexamethylene adipamide. The nylon polymer was extruded through a slit die as described in Example 3, above. The brine quench bath employed consisted of a 22–23% by weight sodium chloride brine. Films of 1.3-, 3-, and 7-mil thickness were fabricated. The results are summarized in FIGURE 4 from which it may be seen that percent haze per mil of film thickness increases linearly with increasing brine temperature.

EXAMPLE 8

A polyhexamethylene adipamide nylon polymer having an inherent viscosity of 1.9 dl./g., measured in m-cresol at 0.5 g./100 ml. concentration, 25.0±.05° C., was extruded, as described hereinabove, at 285° C. through a slit die which was positioned 1½ inches above the liquid level of a quench bath maintained at 16° C. The take-off rate for the film was 58–60 feet per minute, and the extrusion rate was adjusted so that a 2-mil film was obtained. When the quench liquid consisted of water, the 2-mil film had a 17% haze or 8.5% haze per mil. When the water was replaced by a brine consisting of a 30% by weight solution of sodium acetate in water as quench liquid, the 2-mil film had a 11.5% haze or 5.75% haze per mil.

EXAMPLE 9

The polyhexamethylene adipamide nylon polymer described in Example 8 was extruded through a slit die at 306° C. The die was positioned ½ inch over the liquid level in a quench bath consisting of a 40% by weight of technical grade calcium chloride in water maintained at 10° C. The pH of this solution was 8.1. The extrusion rate was adjusted to that a 5.0 mil film was taken off at a rate of 30 feet per minute and was wiped dry without washing with water. This 5.0 mil film had a 1.5% haze or 0.3% haze per mil.

EXAMPLE 10

The polyhexamethylene adipamide nylon polymer described in Example 8 was extruded through a slit die at a melt temperature of 300° C. into a brine solution consisting of a 35% by weight solution of technical grade calcium chloride in water. This brine quench bath was maintained at 12° C. The extrusion rate was adjusted so that a 5-mil film was taken off at a rate of 45 feet per minute. When, after quenching in the calcium chloride brine, this film was immediately washed in water, it had a haze of 12.9% or 2.6% per mil. However, when a bath containing 23% by weight sodium chloride in water was interposed between the quench bath and the water bath so that each portion of the nylon film was washed in sodium chloride brine for 2 seconds before washing in water, the 5-mil film had only 3.3% haze or 0.66% haze per mil.

As a replacement for the sodium chloride brine as a post-quenching wash, a number of other brines were tested and found effective in preventing the development of haze in nylon films quenched in calcium chloride brines. These other effective brines are listed in Table 1.

*Table 1*

| Salt in Post-Quenching Bath | Salt Concentration g./100 ml. H₂O | Percent Haze (5-mil film) |
|---|---|---|
| Control (H₂O) | none | 12.9 |
| NaCl | 23 | 3.3 |
| AlCl₃ | 50 | 5 |
| Al₂(SO₄)₃ | 30 | 5 |
| MgCl₂ | 36 | 5 |
| LiCl | 20 | 5–10 |
| Na₂SO₄ | 10 | 5–10 |
| NaOOCCH₃ | 30 | 3 |
| Na Citrate | 45 | 5 |
| Ca Acetate | 17 | 5 |

The high gloss of nylon films which have been quenched in brine solutions according to the process of this invention was quantitatively demonstrated by measurements using the Gardner 20° glossmeter. The gloss of a specimen is defined as the luminous fractional reflectance of a specimen at the specular direction. A standard method (ASTM #D–523–53T) was employed. Some typical results for films of polyhexamethylene adipamide nylon are listed in Table 2.

Table 2
GLOSS OF POLYHEXAMETHYLENE ADIPAMIDE NYLON FILMS

| Quench Bath | 1st Washing Bath | Gloss Reading (Percent Reflectance) |
|---|---|---|
| Water | | 30–45 |
| 23% NaCl | water | 60–75 |
| 15% CaCl$_2$ | water | 50–75 |
| 15% CaCl$_2$ | 20% NaCl | 95–100 |

From the data presented in Table 2, it is apparent that it is possible to obtain very glossy surfaces on nylon film by the use of brine quench baths. Nylon films quenched in calcium chloride brine and washed in sodium chloride brine before final washing in water are particularly glossy, reaching 100% reflectance at 20° specular direction.

The high gloss of brine-quenched nylon films, as well as at least part of the decreased haze, is due to the structure of the surface of the nylon films which structure is determined in large part by the nature of the medium used to quench the molten films. FIGURES 5–A, –B, and –C, show drawings of photomicrographs, taken at 240× magnification and enlarged 3× to give 700× magnification, of polyvinyl acetate replicas of the surfaces of polyhexamethylene adipamide nylon films quenched, at about 10° C., in (A) water, (B) 21% sodium chloride brine, and (C) 40% calcium chloride brine. These photomicrographs show the change from a grainy, rough surface having deep crevices surrounding hillocks of the polymer, FIGURE 5–A, which was obtained by quenching in water, to a non-grainy surface which is almost perfectly smooth except for widely-spaced, relatively large humps rising above the plane surface, FIGURE 5–C, which was obtained by quenching the same nylon film in 40% calcium chloride brine. The surface obtained on the film from the same nylon using the sodium chloride brine quench, FIGURE 5–B, is intermediate, as would have been predicted in view of the intermediate gloss of this film; here there is still evidence of some grainy structure such as seen in FIGURE 5–A, but it is a finer-grained structure with less deep crevices than the structure of the surface of the water-quenched film.

Additional evidence of the relation between the thickness and grain of the surface layer and the transparency of extruded nylon films was obtained from photomicrographs of cross-sections of films. FIGURE 6–A shows a drawing of a photomicrograph of a surface-layer typical of cold water-quenched polyhexamethylene adipamide nylon film; the surface layer is 10–12 microns thick and is composed of spherulites having average diameters greater than 1 micron; FIGURE 6–B shows a drawing of a photomicrograph of a surface layer typical of a very glossy, highly transparent brine-quenched film made from the same nylon using a CaCl$_2$ brine. This surface contains no resolvable spherulites; a very fine grain extends into the film to a depth of 1 to 2 microns. FIGURE 6–C shows a drawing of a photomicrograph of a surface layer of another polyhexamethylene adipamide film; this surface layer, while it contains no resolvable spherulites, is grainy to a depth of 35 microns; as a result, the transparency and haze, while not as poor as for the film of FIGURE 6–A, are much poorer than for the film shown in FIGURE 6–B. From a number of such experiments, it has been found that, even in the absence of resolvable spherulites, the grainy surface layers of films must be kept at a total of less than 20 microns (for two surfaces) thickness in order to obtain high transparency and freedom from haze. This result is achieved by employing the conditions of the process of this invention. FIGURE 6–D shows a drawing of a photomicrograph of another brine-quenched nylon film having a very thin (2–3 mil) grainy surface layer containing some spherulites having diameters as large as 2–3 mils; this film has high transparency (less than 2.2% haze), similar to that of the film of FIGURE 6–B but is lower in gloss. It is typical of many NaCl brine-quenched films.

Thus this invention has provided a process whereby molten nylon films may be quenched and washed to yield solid nylon films of exceptional gloss and transparency due to the combination of an internal structure in which the spherulite size, as measured by microscopy, is less than 1 micron, on the average, with essentially no spherulites as large as 3 microns in diameter and a surface structure which approaches a smooth plane. This surprising result is achieved principally by employing a salt solution, rather than water, as quenching medium. The particular degree of transparency and gloss achieved with a particularly nylon polymer and a particular salt solution depends upon the concentration of the salt, as shown by Example 6, as well as upon the rate of quenching which is limited by film thickness, as shown by Example 4, the rate of film travel, as shown by Example 5, and quench bath temperature, as shown by Example 7. While a complete explanation of the reasons for the effectiveness of these salt solutions as quenching liquids for nylon films is not now known, it is thought that the explanation lies in the tying up of water molecules by solvation with the ions. Thus alkaline earth cations are more highly solvated than alkali cations; the former are also more effective than the latter, at a given concentration, in promoting transparency and gloss when used to quench nylon films. It is known that the presence of water in nylon polymers promotes spherulitic growth; the presence of dissolved salts in the quench-bath limits, by solvation, the amount of water available to the nylon.

The phenomenon of surface hazing caused by immediate water washing after quenching in salt solution which is far more noticeable when alkaline earth salts are employed than when alkali metal salts are employed, where it can usually be ignored, is not now understood. This subsequent surface hazing of the nylon films can be eliminated or greatly reduced by employing means to wipe the film surface dry rather than washing it, as described by Example 9, by aging the film before washing, or by first washing the quenched film in a solution of a different salt, as illustrated by Example 10.

It should be clear that this invention provides a novel process for fabricating glossy, transparent nylon films which process combines the use of certain liquids as quenching liquids and other liquids as washing liquids, with control of certain processing steps and conditions including film thickness, quench temperature, and rate of film travel. The desired result, the economical production of glassy, transparent nylon films, is achieved by the proper combination of all of these factors, as taught by the disclosures and examples presented herein. The films obtained by this process are particularly useful in packaging and wrapping articles where it is desired to have high strength and toughness coupled with transparency. They are useful for the preparation of photographic films, particularly transparencies, where their exceptional toughness and resistance to high temperatures, coupled with transparency, surface hardness, and gloss provide a valuable combination of properties. Likewise they are useful for decorative purposes, particularly as the surface layer in decorative laminates. When cut into thin strips, these films can be interwoven with textile fibers to provide decorative effects. Many other uses of this nature will be obvious from the outstanding properties of the films.

This invention comprises the integrated process when employed as disclosed herein, and the product obtained.

There is claimed:

1. A process for preparing glossy, transparent films having a thickness between 0.5 and 10 mils from a superpolycarbonamide nylon resin selected from the group consisting of polymers obtained by the polymerization of dicarboxylic acids with diamines and their amide-forming derivatives and the polymers obtained by the polymerization of amino-acids and their amide-forming derivatives which comprises the following steps: (1) extruding the nylon through a slit die as a molten film at from 5° to 75° C. above the melting point of said nylon; (2) passing the molten film into an aqueous brine quench bath maintained at a temperature from −10° to +30° C., said aqueous brine consisting of a solution in water of at least 20% by weight of a salt chosen from the group consisting of a cationic member chosen from the group consisting of alkali metal and alkaline earth metal cations and an anionic member chosen from the group consisting of chloride, bromide, nitrate, sulfate, and organic monocarboxylates containing from one to four carbon atoms per molecule, and mixtures thereof; (3) passing the quenched film from the quench bath into a series of baths consisting of from 1 to 3 baths, the first bath containing a liquid chosen from the group consisting of an aqueous solution containing more than 10% by weight of a salt chosen from the group consisting of alkali metal chlorides, alkali metal sulfates, alkali metal nitrates, alkali metal acetates, alkali metal citrates, aluminum chloride, and aluminum sulfate, and the remaining baths containing water; and (4) drying and winding up the washed film at a rate of from 40 to 150 feet per minute.

2. A process for preparing glossy, transparent films, having a thickness between 0.5 and 10 mils, from polyhexamethylene adipamide nylon which comprises the following steps: (1) extruding the polyhexamethylene adipamide through a slit die as a molten film at from 277° C. to 315° C.; (2) passing the molten film into an aqueous brine quench bath maintained at a temperature from −10° to +30° C., said brine consisting of a solution in water of from 20% to 40% by weight of calcium chloride; (3) subsequently passing the quenched film first into a brine consisting of a solution of from 15% to 25% by weight of sodium chloride in water, and, second, into water; and (4) drying and winding up the washed film at a rate of from 40 to 110 feet per minute.

References Cited in the file of this patent
UNITED STATES PATENTS

| | | |
|---|---|---|
| 2,174,527 | Peterson | Oct. 3, 1939 |
| 2,191,556 | Carothers | Feb. 27, 1940 |
| 2,212,770 | Foster | Aug. 27, 1940 |
| 2,212,772 | Graves | Aug. 27, 1940 |
| 2,318,679 | Dreyfus | May 11, 1943 |
| 2,324,397 | Hull | July 13, 1943 |
| 2,340,652 | Dwyer | Feb. 1, 1944 |
| 2,354,744 | Dreyfus | Aug. 1, 1944 |
| 2,379,557 | Watkins | July 3, 1945 |
| 2,514,088 | Pinsky | July 4, 1950 |
| 2,585,156 | Montross | Feb. 12, 1952 |
| 2,846,289 | Gray | Aug. 5, 1958 |

UNITED STATES PATENT OFFICE
CERTIFICATE OF CORRECTION

Patent No. 3,027,602                                    April 3, 1962

Edward Fritjoff Hamilton, Jr., et al.

It is hereby certified that error appears in the above numbered patent requiring correction and that the said Letters Patent should read as corrected below.

Column 2, line 44, strike out "four", second occurrence; line 55, for "+450° C." read -- +45° C. --; column 4, line 39, for "percentage" read -- percent --; line 67, for "m-creson" read -- m-cresol --; column 5, line 17, before "obtained" insert -- film --; line 45, for "percentage" read -- percent --; column 6, line 25, for "to" read -- so --; column 8, line 50, for "glassy" read -- glossy --; line 74, after "of", first occurrence, insert -- the --.

Signed and sealed this 17th day of July 1962.

(SEAL)
Attest:

ERNEST W. SWIDER                                  DAVID L. LADD
Attesting Officer                                    Commissioner of Patents